Dec. 25, 1928.  H. FORD  1,696,347
LIQUID LEVEL GAUGE
Filed Aug. 18, 1926  2 Sheets-Sheet 1
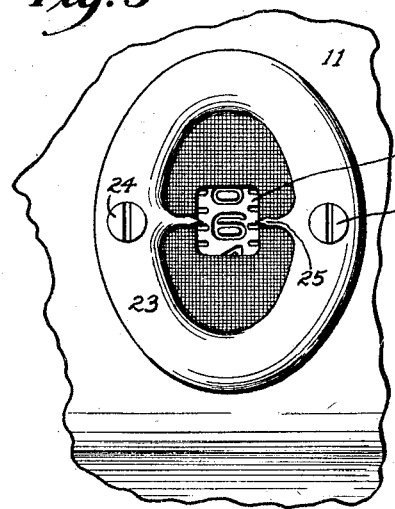
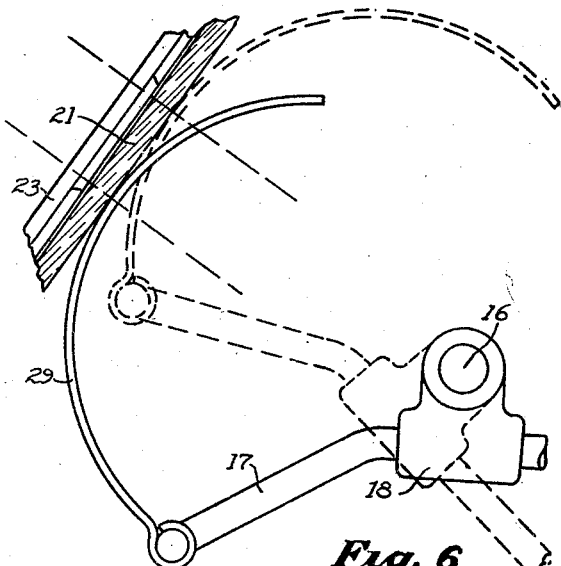
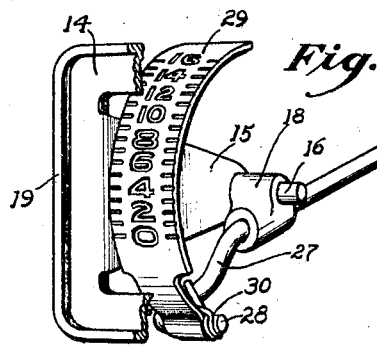
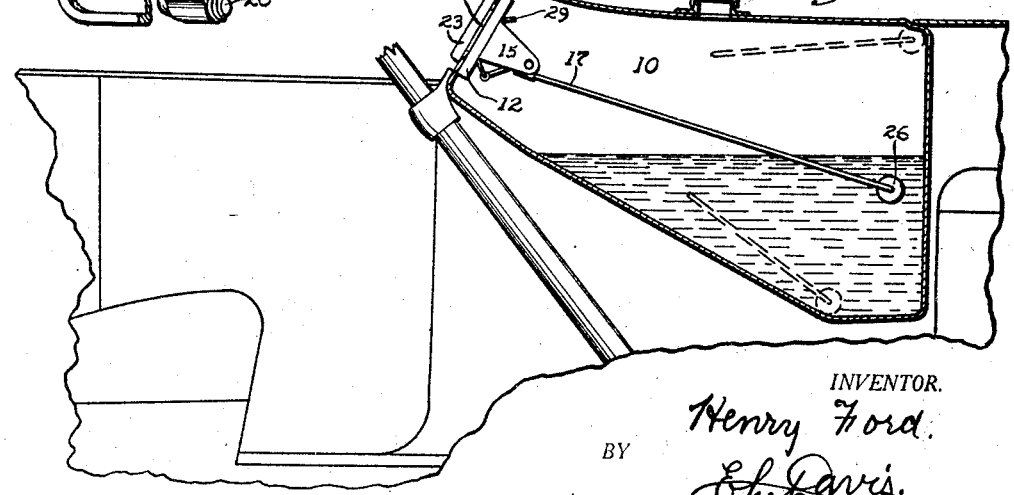
INVENTOR.
Henry Ford.
BY
E. L. Davis.
ATTORNEY.

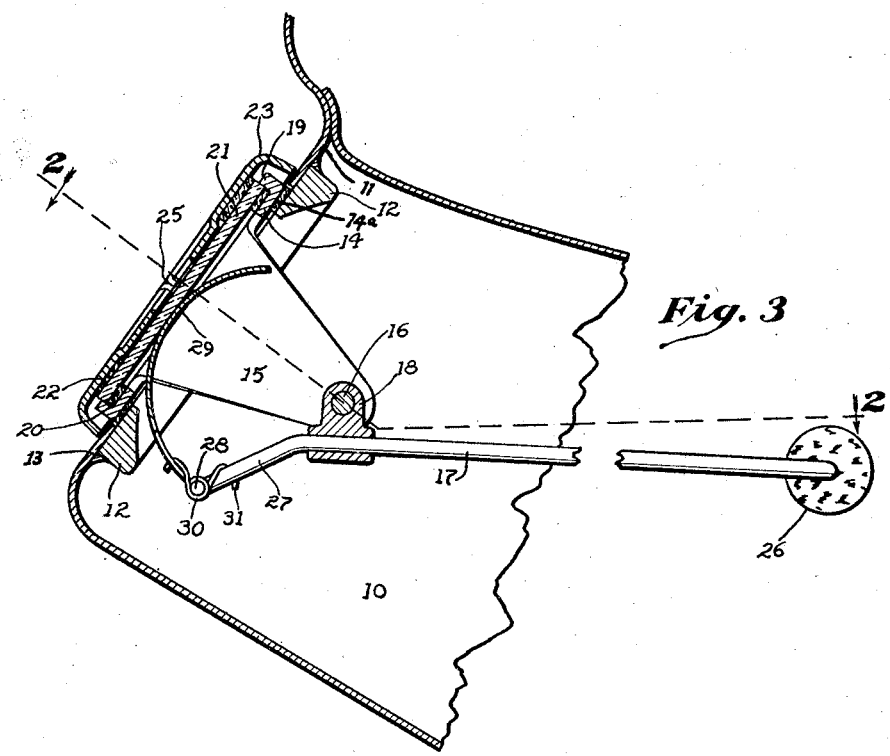
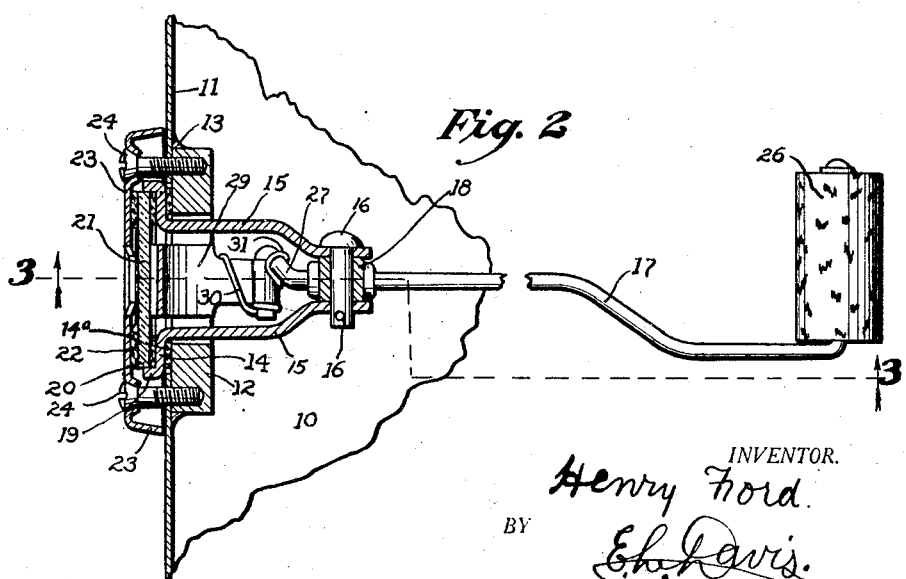

Patented Dec. 25, 1928.

1,696,347

UNITED STATES PATENT OFFICE.

HENRY FORD, OF DEARBORN, MICHIGAN.

LIQUID-LEVEL GAUGE.

Application filed August 18, 1926. Serial No. 129,971.

The object of my invention is to provide a gauge structure of simple, durable and inexpensive construction.

A further object of my invention is to provide a gauge structure which may be mounted in the tank of a motor vehicle or the like in the side wall thereof to indicate the amount of liquid in the tank.

Still a further object of my invention is to provide a gauge which is especially adapted for a fuel tank designed to hold gasoline or some similar transparent liquid and which is designed to eliminate the dial and the sealing device for the dial, ordinarily provided in connection with gauges.

Still a further object of my invention is to provide a gauge of the type having a stationary pointer and a movable dial, the parts being so arranged that the glass through which the gauge is read will be kept clean and transparent by the action of the gauge itself.

Still a further object of my invention is to provide a gauge for a fuel tank in which the moving dial will contact at all times with the gauge glass at the point where the gauge is to be read whereby the significant figure on the gauge will always be the most readily seen and whereby the glass adjacent to the significant figure will be kept transparent.

With these and other objects in view, my invention consists in the arrangement, combination, and construction of the various parts of my improved gauge construction as described in the specification, claimed in the claims, and illustrated in the accompanying drawings, in which:

Figure (1) shows a vertical, central, sectional view through my improved fuel tank and gauge and the associated parts of an automotive vehicle.

Figure (2) shows an enlarged sectional view taken on the line 2—2 of Figure (3).

Figure (3) is a similar view taken on the line 3—3 of Figure (2).

Figure (4) shows an enlarged perspective detailed view of the float, the dial, and the supporting means therefor, parts being broken away to better illustrate the construction.

Figure (5) shows an elevation or front view of a gauge illustrating the position of the pointers and the figures on the dial from the point of view of the observer, and Figure (6) shows an enlarged somewhat diagrammatical view illustrating the manner in which the gauge operates so that the gauge glass is self-cleaning.

Referring to the accompanying drawings, I have used the reference numeral (10) to indicate generally a fuel tank for an automotive vehicle and especially such a tank as would be used in connection with the cowl of such a vehicle. It will be noted that my improved gauge is particularly adapted for this type of tank as the rear vertical wall of the tank may be either used to form the instrument board of the vehicle or may be disposed very near to the instrument board of such vehicle so that a gauge mounted in the rear wall of the fuel tank will be visible from the driver's seat.

The rear wall (11) of the fuel tank is provided with an opening of appropriate size therein and a screw receiving ring (12) is welded or otherwise suitable secured at (13) to the wall (11) of the tank around the gauge opening therein.

A casting is made which consists of a rectangular or other suitably shaped ring (14), which is provided with a pair of rearwardly extending ears (15) designed to receive a pivot pin (16) which may form the pivotal support for the operating rod (17) of the gauge. This operating rod (17) may be pivotally mounted on this pin (16) by means of a casting (18) of the form illustrated in Figure (4) if desired. The ring (14) is designed to extend around the edge of the gauge opening in the wall (11) of the fuel tank and on the outside surface of the tank in such position that the ears (15) will extend through the opening in the wall (11). The ring (14) is provided with a flange (19) for a purpose which will hereinafter be described. Mounted on the outside ring (14) is a waterproof gasket (20), upon which is supported the gauge glass (21) and a second gasket (22) of liquid tight material lays on the outer surface of the gauge glass (21). A finish plate (23) is provided with a suitable gauge opening and is tightened up against the gasket (22) by a pair of screws (24) so that tightening these screws (24) holds on the finish plate (23), compresses the gaskets (20 and 22) against the glass (21) and ring (14), and also presses the ring (14) against a compressible gasket 14ª which presses against the outer surface of the fuel tank wall (11). It will thus be seen that when the screws (24) are tightened down into the screw receiving inside ring (12) that the parts will all be held in position and pressed together so that a liquid tight joint may be formed between the gauge glass and the interior of the fuel tank (10), also the outer washer (22) prevents the finish plate (23) from normally imparting any jar to the gauge glass (21) which will cause breakage thereof. The finish plate (23) is provided with a pair of opposite pointers (25) which extend toward the center of the opening through this finish plate and indicate the place at which the dial on my improved gauge should be read. The glass may be further colored either on the outside or inside thereof to limit the transparent portion thereof to a size approximately the size of the figures on the dial if desired, as is indicated in Figure (5).

The operating rod (17) is provided at the inner end thereof with a cork (26) or other suitable float designed to normally rest on the surface of the fuel in the fuel tank and to swing the operating rod (17) on its pivot (16). This operating rod is provided adjacent to the outer end thereof with a somewhat offset portion (27) which terminates in the right angle bend (28), which in turn forms a pivotal support for one end of a metallic arcuate indicating dial (29) the dial being formed from aluminum in the device shown therein. This dial member (29) is yieldingly urged into contact with the inner surface of the gauge glass (21) by a spring (30), one arm of which engages the dial member (29) and the other arm engages the portion (27) of the operating rod (17). The central portion of this spring (30) is wound around the end of the portion (28) of the operating rod (17) and the ends of the spring are hooked as at (31) over the portion (27) and dial (29) so that this spring (30) performs the dual function of holding the dial (29) detachably mounted on the operating rod (17) and also serves to urge the dial member against the gauge glass.

The radius of the operating rod (17) relative to the center of the curvature or arc of the dial member (29) is such that the portion of the dial (29) directly back of the pointers (25) will always be in contact with the gauge glass no matter what the position of the operating rod (17) may be. The figures on the face of the dial (29) will thus be brought as close to the glass (21) as is possible and any movement of the operating rod (17) will always serve to wipe the dial across the rear surface of the gauge glass, thereby keeping the dial and the glass clean and transparent at all times.

Among the many advantages arising from the use of my improved gauge it will be noted, first, that the gauge may be disposed within the tank and still the indicating portion thereof may be in the place where the other dials and instruments for an automotive vehicle are ordinarily placed and, therefore, in relatively easy view of the operator. It should also be pointed out that much difficulty has been experienced in the past in making gauges of various descriptions in that it was necessary to seal the space between the glass and the dial through which the pointer operated and also to seal the joint between the pointer operating mechanism and the dial and the interior of the tank against leakage both because of the waste of the liquid in the tank and also because if the liquid would leak in on the face of the dial, then the position of the pointer relative to the dial would become difficult to determine. If also the device is improperly sealed so that dust or dirt can get in from the outside below the gauge glass, then it is impossible to clean same and the pointer would be invisible. It will thus be seen that a further advantage in my improved device is that the dial and the gauge glass is automatically cleaned and the number of liquid and gas tight joints which must be formed in connection with most gauges has been cut down.

Another advantage results from the few operating parts, as there are only two moving parts and both of these are mounted on pivots which are relatively long lived constructions from a mechanical standpoint. A further advantage arises in the ease of assembly and disassembly as it is only necessary to remove the two screws (24) in order to assemble and disassemble substantially the entire device. If it should for any reason be necessary to remove the dial (29) from the operating rod (27) this could be accomplished by merely unhooking the ends of the spring (30) from the portion (27) of the operating rod.

Some changes may be made in the construction and operation of my improved gauge device without departing from the spirit of my invention, and it is my intention to cover by the following claims such changes as may reasonably be included within the scope thereof.

I claim as my invention:

1. In a gauge structure, a bracket, an operating rod pivoted thereto, a gauge glass disposed adjacent to said bracket and operating rod, and an arcuate dial member mounted on the operating rod in position to yieldingly contact with the surface of the gauge glass in any of a plurality of predetermined positions of the operating rod, the parts being so constructed that substantially all of the significant dial surface and the inner surface of the significant area of the glass will have wiping contact during the movement of the operating rod through its various positions.

2. In a gauge structure a fuel tank having one wall with an opening therein, a gauge glass extended across said opening, a bracket member extending inwardly of the tank from said opening, an operating rod pivoted intermediate of its ends on said bracket, a float device at the one end of said rod, an arcuate dial member pivoted to the other end of said rod, and means for yieldingly urging the surface of the dial member into contact with the inner surface of the gauge glass.

3. In a gauge structure a fuel tank having one wall with an opening therein, a gauge glass extended across said opening, a bracket member extending inwardly of the tank from said opening, an operating rod pivoted intermediate of its ends on said bracket, a float device at the one end of said rod, an arcuate dial member pivoted to the other end of said rod, and means for yieldingly urging the surface of the dial member into contact with the inner surface of the gauge glass, the curvature of the dial member being such that it contacts with a limited area of the glass at substantially the same place in any of the normal positions of the operating rod.

Signed at Dearborn in the county of Wayne, State of Michigan, this 31st day of July 1926.

HENRY FORD.